United States Patent [19]

Willson

[11] Patent Number: 5,373,165

[45] Date of Patent: Dec. 13, 1994

[54] GUIDE FOR HAND HELD OPTICAL SCANNER

[76] Inventor: William A. Willson, 4528 S. Pony Ave., Boise, Id. 83709

[21] Appl. No.: 85,928

[22] Filed: Jul. 6, 1993

[51] Int. Cl.⁵ .......................................... G06K 13/06
[52] U.S. Cl. .................................. 250/566; 235/472; 235/483
[58] Field of Search .................. 250/566, 568, 227.13, 250/215; 235/472, 482–484

[56] References Cited

U.S. PATENT DOCUMENTS

| | | | |
|---|---|---|---|
| 4,684,998 | 8/1987 | Tanioka et al. | 250/566 |
| 4,721,859 | 1/1988 | Lewis | 250/566 |
| 4,758,732 | 7/1988 | Kyriakides | 235/482 |
| 4,860,377 | 8/1989 | Ishigaki | 250/566 |
| 5,191,196 | 3/1993 | Mercede et al. | 235/484 |

Primary Examiner—David C. Nelms
Assistant Examiner—Stephone B. Allen
Attorney, Agent, or Firm—Paul F. Horton

[57] ABSTRACT

A guide for mounting on an optical scanner, said guide including a guide framework provided with a laterally extending guide arm having a straight edge bearing surface which cooperates with a bearing surface on the scanner housing whereby the scanner can be moved in a parallel relationship with the straight edge to prevent lateral movement of the scanner or unintentional rotation of the scanner for superior scanning capability. The guide arm is preferably received within a passage or channel in the framework for reciprocal, lateral movement to adjust the guide arm and hence the bearing surface to be in proper alignment with the bearing surface on the scanner. Double sided adhesive tape provides secure attachment and detachment from the scanner without mutilation of the scanner.

16 Claims, 2 Drawing Sheets

GUIDE FOR HAND HELD OPTICAL SCANNER

BACKGROUND OF THE INVENTION

1. Field of the Invention

This invention relates in general to optical scanners for computers and, more particularly, to scanner guides to prevent scanning errors.

2. Description of the Prior Art

The primary problem with hand held scanners are the scanning errors caused by unintentional mis-aligned movement of the scanner. Even subtle lateral twitches can cause errors which may require re-scanning or image clean-up. Most scanner housings have rounded surfaces for hand comfort and therefore do not have sufficient aligned bearing surfaces for holding the scanner firmly against a straight edge to prevent rotary or lateral movement.

For remedying this situation, several types of guides have been created. U.S. Pat. No. 3,735,350, issued to J. Lemelson, shows a scanning pencil having a rear wall adapted to engage a straight edge for guidance. U.S. Pat. Nos. 4,684,998 to H. Tanioka et al; 4,721,859, issued to J. Lewis; 4,758,732, issued to A. Kryiakides; and 4,860,377, issued to T. Ishigaki, all show guides for movement of a scanner. U.S. Pat. No. 5,063,508, issued to Y. Yamada et al and U.S. Pat. No. 5,136,151, issued to H. Kobayaski, disclose casings containing guide mechanisms. The Lemelson, Yamada, and Kobayashi devices are incompatible with and are not attachable to conventional scanners. The Ishigaki reference simply shows a scanner wherein the housing is caused to engage a straight edge for guidance.

SUMMARY OF THE INVENTION

The present invention is a guide for hand held optical scanners which includes a guide framework which is readily attachable to all known conventional hand scanners and which is provided with a guide arm which, in cooperation with a bearing surface on the scanner housing, is operable to engage a straight edge to prevent wobbling or any lateral movement of the scanner as the scanner is moved along the straight edge. The guide arm is preferably laterally adjustable relative to the framework for precision alignment with the bearing surface of the scanner housing. A more complete description of the guide may be found in the appended claims.

It is therefore a general object of the present invention to provide a guide for a hand held optical scanner which is readily attachable and detachable from an existing scanner housing, without mutilation of the scanner, and which provides a bearing surface which, in cooperation with a bearing surface on the scanner housing, allows movement of the scanner in a straight line parallel with the straight edge.

More particularly, it is a general object of the present invention to provide a guide for a hand held optical scanner, which, in cooperating with a bearing surface on the scanner, increases the length between bearing surfaces to provide greater stability in movement of the scanner.

It is a primary object of the present invention to provide a guide for a hand held optical scanner which includes a framework and a guide arm laterally moveable within the framework for convenient alignment adjustment.

More specifically, it is an object of the present invention to provide a guide for a hand held optical scanner in which the guide arm is removable and reversibly placed within a guide framework for use by both right and left handed users.

It is also an important object of the present invention to provide a guide for a hand held optical scanner in which the guide arm is mounted within the framework behind the scanner so as to not interfere with normal use and comfort of the scanner.

An additional object of the present invention is to provide a guide for a hand held optical scanner having a framework provided with a thin top plate mountable by double sided adhesive tape for maximizing surface area, while minimizing bulk.

Additional objects and advantages will become apparent and a more thorough and comprehensive understanding may be had from the following description taken in conjunction with the accompanying drawings forming a part of this specification.

DETAILED DESCRIPTION OF THE INVENTION

Figure 1:
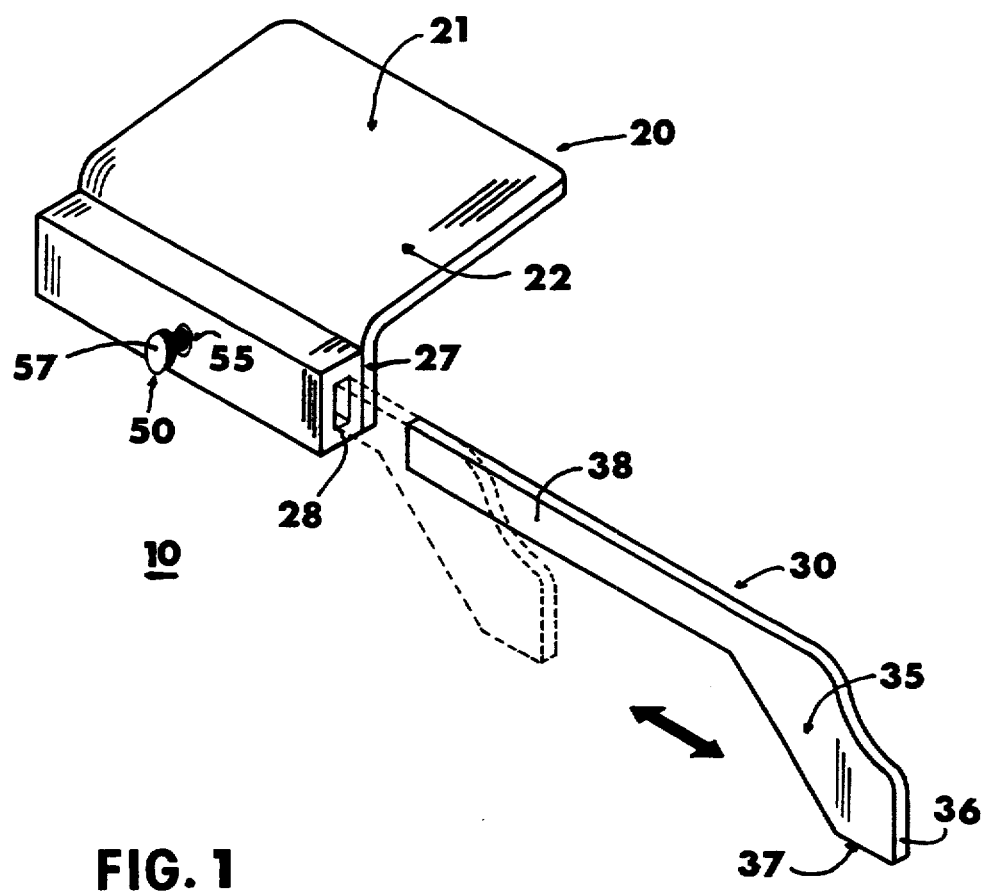
FIG. 1 is an exploded perspective view of a first preferred embodiment of the guide of the present invention, showing the guide arm, as mounted to the guide framework, in dotted lines.
Figure 2:
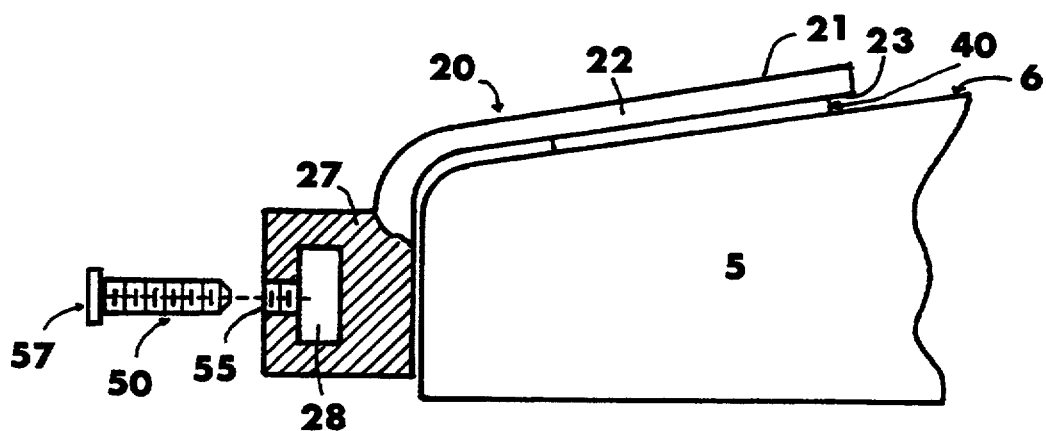
FIG. 2 is a partial sectional side view of the guide framework of the embodiment shown in FIG. 1.
Figure 3:
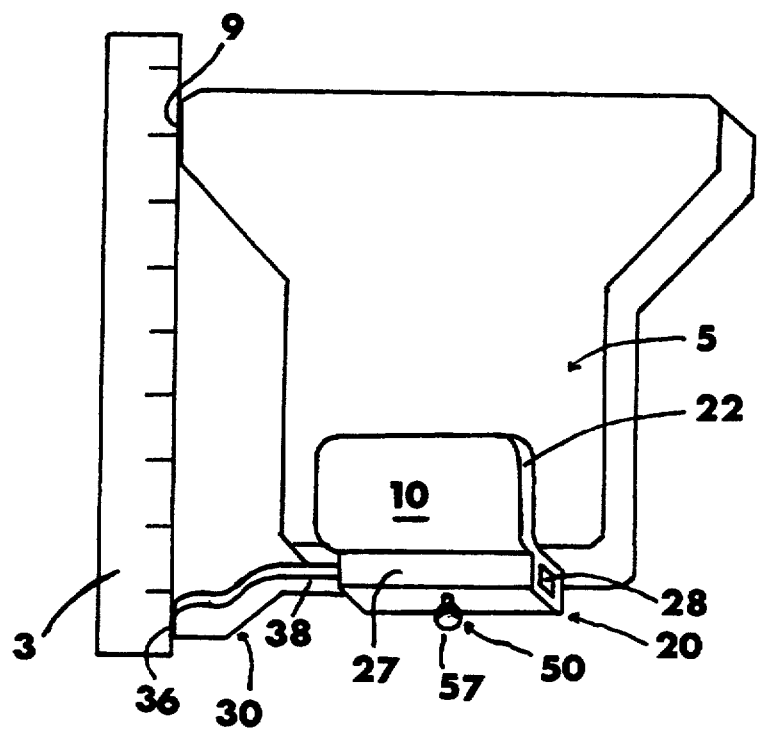
FIG. 3 is a perspective view of the device of FIG. 1, showing the guide arm mounted and with guide arm and scanner housing having bearing surfaces engaging a straight edge.

Referring now to FIGS. 1-3, a first embodiment to be preferred of a scanner guide 10, made according to the present invention is disclosed. Scanner guide 10 includes, generally, a guide framework 20; a guide arm 30; attachment means, designated generally by the numeral 40, for attaching the framework to a scanner 5; and lock means 50 for holding the guide arm in a selected fixed position on the framework.

The guide framework 20 includes a thin top plate 22, provided with substantially planar opposing surfaces, top surface 21 and bottom surface 23. The top plate is adapted to fit over the top surface 6 of scanner 5. Affixed to top plate 22, at its rearward most end, and preferably integral therewith, is a downwardly depending back plate 27 for engaging the rear surface of the scanner. The back plate, in cooperation with the attachment means, provides a firm but temporary affixation between guide framework 20 and scanner 5. Back plate 27 is provided with a laterally oriented tube, channel, or other passage 28, dimensioned to slidingly receive guide arm 30. For securing guide arm 30 in a fixed position relative to the framework, lock means 50, in the preferred embodiment, as shown, includes a threaded aperture 55 which is machined, molded, or otherwise defined in the back plate, in the back center thereof, and a threaded thumb screw 57 for screwing into aperture 55 for engaging guide arm 30 to hold the guide, arm in a selected lateral position within the passage. Pins, clamps, or other lock means, could likewise be employed.

Guide arm 30 includes a shaft portion 38, slidably receivable within passage 28 of framework 20 for reciprocal movement therein for effectively determining the lateral length of the guide arm. At its outermost free end, the guide arm is provided with a finger portion 35 having a substantially vertically planar end surface 36 for engaging a straight edge and a substantially horizontal bottom surface 37 for engaging a support surface. It is to be noted that passage 28 extends completely through the back plate, and that the guide arm may be reversed for entry from the opposing end opening of the passage so as to extend in an opposing direction, as shown in FIG. 3, for use by either right or left handed operators. The guide arm, upon release of the lock means, may therefore be taken from a position within the passage, shown by the dotted lines in FIG. 1, to a completely removed position, shown by the solid lines in the same figure. Both framework 20 and guide arm 30 may be constructed of any suitable material; rigid, thermoset plastic material, being preferred.

For attachment of the guide framework to scanner 5, double sided adhesive tape 40 is highly preferred in that the tape is thin and does not substantially increase the bulk of the device and in that the tape presents a large surface area, both top and bottom, for engaging the bottom surface 23 of top plate 22 and the top surface 6 of the housing of scanner 5, respectively. Further, the tape provides a high coefficient of friction for holding the guide firmly, without noticeable give, on the scanner. Such tape also allows convenient mounting and removal of the guide without mutilation to the scanner.

Figure 4:
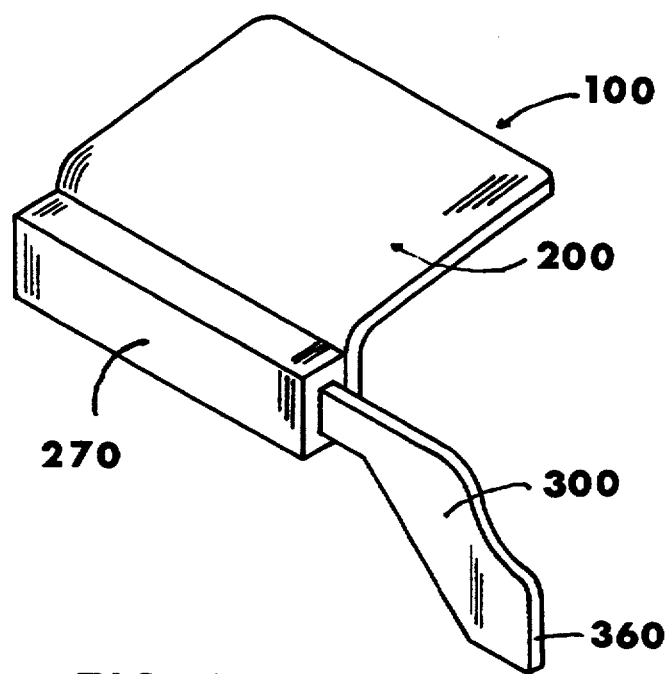
FIG. 4 is a perspective view of a second embodiment of the guide of the present invention wherein the guide arm is affixed directly to the guide framework.

Referring now to FIG. 4, a second embodiment of a guide 100, made according to the present invention is shown to advantage. Guide 100 differs from guide 10 in that the guide arm is affixed to and preferably integral with the framework. This second embodiment has the advantage of being cost efficient, but, obviously, in that the guide arm is immovable relative to the framework, the manufacture must be compatible with a given scanner and greater care must be taken in the precise mounting of the framework to the scanner. Double sided adhesive is again preferred for attaching the framework top plate to the scanner.

Referring to FIG. 3, operation and adjustment of guide 10 will hereinafter be explained. After mounting of guide 10 onto scanner 5 by double sided tape 40, arm 30 is inserted into either end opening of passage 28 of backplate 27 depending upon whether the operator is right or left handed.

Assuming it is desired that guide arm 30 extend to the left, as shown in FIG. 3, the effective length of the arm is either shortened or lengthened by sliding shaft 38 of the arm deeper into or out of passage 28 to bring the free end of the arm into alignment with bearing surface 9 of scanner 5. Screw 57 is then tightened against shaft 38 to hold the guide arm firmly in a fixed position relative to framework 20. It will be noted that the distance between the bearing surface 9 of the scanner and bearing surface 36 of finger portion 35 of arm 30 greatly extends the distance between bearing surfaces, which would otherwise be available if the scanner 5 is used without the guide 10 of the present invention. The distance between bearing surfaces is therefore increased on all scanners on which the guide of the present invention is mounted. This increase in distance between bearing surfaces increases the stability of the scanner, as bearing surface 9 of the scanner 5 and bearing surface 36 of guide arm 30 are brought into contact with straight edge 3 for parallel movement of the scanner along the straight edge.

Having thus described in detail a preferred selection of embodiments of the present invention, it is to be appreciated and will be apparent to those skilled in the art that many physical changes could be made in the apparatus without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

I claim:

1. A guide for a hand held optical scanner having a bearing surface for scanning movement along a straight edge, said guide comprising:

a guide framework, said framework including a guide arm laterally extending therefrom, said guide arm provided with a bearing surface for engaging a straight edge; said bearing surface of the scanner cooperating with the bearing surface of said guide arm for scanning movement of the scanner in a straight line parallel with said straight edge; and attachment means for affixing said guide framework to the scanner.

2. The guide as described in claim 1 wherein said bearing surface of said guide arm is vertically planar.

3. The guide as described in claim 1 wherein said framework includes a top plate having a bottom surface mateable with a top surface of the scanner and wherein said attachment means is located between the top surface of the scanner and the bottom surface of said top plate.

4. The guide as described in claim 3 wherein said attachment means comprises double sided adhesive tape.

5. The guide as described in claim 1 wherein said framework further includes a back plate for engaging a back surface of the scanner and wherein said guide arm extends laterally from said back plate.

6. The guide as described in claim 5 wherein said guide arm is integral with said back plate.

7. A guide for a hand held optical scanner having a bearing surface for scanning movement along a straight edge, said guide comprising:

a guide framework;

attachment means for affixing said guide framework to a scanner;

a guide arm mounted to said framework for reciprocal lateral movement with respect thereto, said guide arm provided with a bearing surface for engaging a straight edge; said bearing surface of the scanner cooperating with the bearing surface of said guide arm for scanning movement of the scanner in a straight line parallel with said straight edge; and lock means for holding said guide in a selected fixed position on said framework.

8. The guide as described in claim 7 wherein said bearing surface of said guide arm is vertically planar.

9. The guide as described in claim 7, wherein said framework includes a top plate having a bottom surface mateable with a top surface of the scanner and wherein said attachment means is located between the top surface of the scanner and the bottom surface of said top plate.

10. The guide as described in claim 9 wherein said attachment means comprises double sided adhesive tape.

11. The guide as described in claim 7 wherein said framework includes a back plate for engaging a back surface of the scanner, said back plate defining a passage for receiving said guide arm and for reciprocal movement of said guide arm therein for alignment of said bearing surface of said guide arm with said bearing surface of said scanner.

12. The guide as described in claim 11 wherein said lock means comprises a threaded bolt receivable within a threaded aperture defined by said back plate; said threaded bolt engageable with said guide arm for holding said guide arm in a fixed position within said passage.

13. A guide for a hand held optical scanner having a bearing surface for scanning movement along a straight edge, said guide comprising:

a guide framework including a top plate having a bottom surface mateable with a top surface of the scanner;

attachment means for affixing said guide framework to a scanner, said attachment means comprising two sided adhesive tape positioned between said top plate and the scanner;

a guide arm mounted to said Framework for reciprocal lateral movement with respect thereto, said guide arm provided with a bearing surface for engaging a straight edge; said bearing surface of the scanner cooperating with the bearing surface of said guide arm for scanning movement of the scanner in a straight line parallel with said straight edge; and lock means for holding said guide in a selected fixed position on said framework.

14. The guide as described in claim 13 wherein said guide framework further includes a back plate for engaging a back surface of the scanner, said back plate defining a passage for receiving said guide arm and for reciprocal movement of said guide arm therein for alignment of said bearing surface of said guide arm with said bearing surface of said scanner.

15. The guide as described in claim 14 wherein said lock means comprises a threaded bolt receivable within a threaded aperture defined by said back plate; said threaded bolt engageable with said guide arm for holding said guide arm in a fixed position within said passage.

16. The guide as described in claim 13 wherein said bearing surface of said guide arm is vertically planar.

* * * * *